June 10, 1958  F. W. REES  2,838,266
ADJUSTABLE STRUT
Filed Nov. 1, 1954
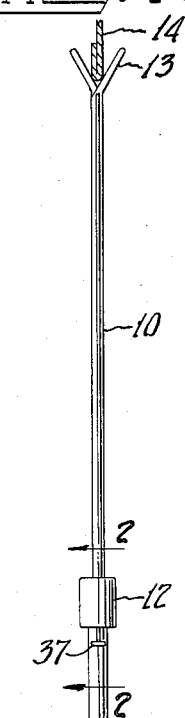
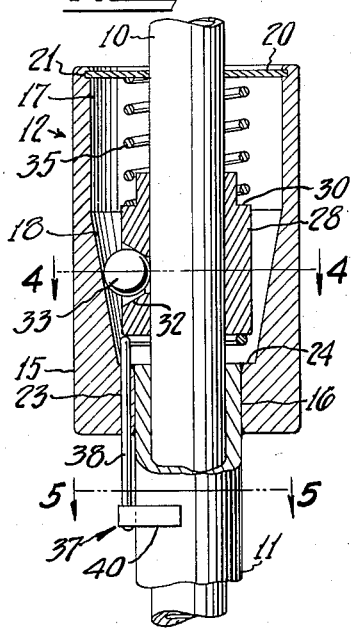
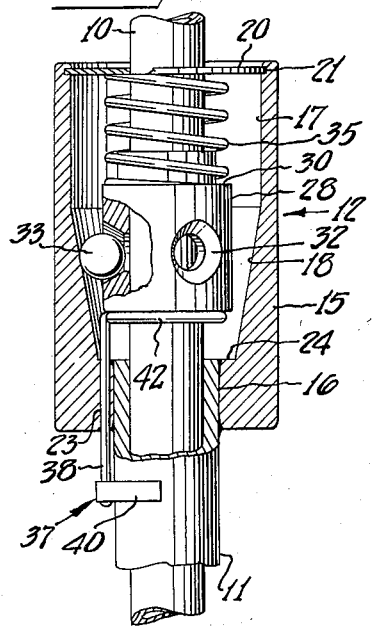
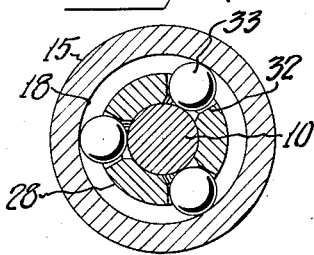
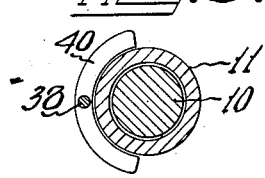
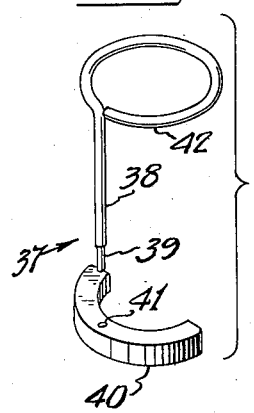
INVENTOR
FRANK W. REES
BY
Cook and Schermerhorn
ATTORNEYS

United States Patent Office 2,838,266
Patented June 10, 1958

2,838,266

ADJUSTABLE STRUT

Frank W. Rees, Madras, Oreg., assignor to Cameron W. Sparks, Oswego, Oreg.

Application November 1, 1954, Serial No. 466,146

1 Claim. (Cl. 248—355)

This invention relates to an adjustable strut for supporting structural parts in spaced relation.

A primary object of the invention is to provide an improved strut which is adapted to be rapidly adjusted to variable lengths.

A further object is to provide an adjustable strut having a pair of telescoping members and a novel locking means therefor employing a floating cage and detents guided therein for normally restricting axial relative movement of the members in one direction and permitting free axial movement of the members in the opposite direction.

An additional object of the invention is to provide a quick release mechanism adapted to disengage the locking means for permitting relative movement of the pair of telescoping members in both axial directions.

Further objects are to provide an improved adjustable strut which is simple in structure and has a minimum of operating parts, which is strong and reliable in use, and which is inexpensive to manufacture.

Briefly, the invention comprises a telescoping strut composed of a rod slidable in a tubular base member and a novel and improved means for locking the rod and base member in one direction of relative axial movement. The locking means employs a spring biased cage which is slidable on the rod and which carries a plurality of detents for gripping said rod in random positions. A release mechanism is adapted to engage the floating cage for rapidly releasing the detent grip on the rod.

The invention will be better understood and additional objects and advantages will become apparent from the following description taken in connection with the accompanying drawings. It is to be understood, however, that the invention may take other forms, and that all such modifications and variations within the scope of the appended claim which will occur to persons skilled in the art are included in the invention.

In the drawings:

Figure 1 is an elevational view of the present strut assembly;

Figure 2 is a sectional view taken on the line 2—2 of Figure 1 and showing the locking means in a normally biased position for gripping and holding the rod in a set position with relation to the tubular base member;

Figure 3 is a sectional view similar to Figure 2 but showing the locking means raised out of gripping position by the release mechanism;

Figure 4 is a cross sectional view taken on the line 4—4 of Figure 2;

Figure 5 is a cross sectional view taken on the line 5—5 of Figure 2; and

Figure 6 is an exploded view of the release mechanism.

Referring in detail to the drawings, the invention comprises, in general, a pair of telescoping cylindrical members 10 and 11 and a locking means 12. Member 10 comprises an elongated rod and member 11 comprises a tubular base structure to receive the member 10.

Each of members 10 and 11 has a forked end portion 13 adapted to engage structural parts 14 intended to be held in spaced relation. A particular use for the present strut is for holding the hood of an automobile in a raised position so that a mechanic or attendant can service the motor with the hood out of the way and at the same time the strut obviates the possibility of the hood falling on the mechanic or attendant.

Secured to the end of the tube 11 is a housing 15 having a bore 16 for fixedly receiving the tube 11, a bore 17 at the opposite end thereof having a diameter greater than the bore 16, and a connecting bore 18 extending between the bore 17 and bore 16 and having tapered conical side walls. One end of bore 17 is closed by an end plate 20 secured in a groove 21 in the housing 15. Housing 15 is provided with a hole 23 parallel with the bore 16, the bottom of bore 18 being of somewhat larger diameter than bore 16 to provide a shoulder 24 through which the hole 23 opens into the central portion of the housing.

Slidably mounted on the rod member 10 within the housing 15 is a floating cage or slidable collar 28 having a peripheral groove 30 on one end. Provided radially in the collar 28 is a plurality of tapered openings 32 for receiving detents comprising balls 33 which are engageable with the rod 10 and the tapered wall of bore 18 to prevent relative axial movement of rod 10 and the housing 15 in the one direction which would shorten the length of the strut. Collar 28 is biased toward the smaller end of bore 18 by a compression spring 35 engageable between the plate 20 and the peripheral groove 30 in the collar.

Slidable in bore 23 is a release mechanism 37, shown in detail in Figure 6. The mechanism comprises a stem 38 having a reduced portion 39 on one end for attachment to an arcuate finger piece 40 having an aperture 41 for receiving the reduced portion 39. The other end of stem 38 is formed into a loop 42 which encircles the rod 10 and engages the bottom edge of the collar 28 when the parts are in assembled relation.

Collar 28 is biased toward the smaller end of the bore 18 whereby the balls 33 are moved into a binding and wedging relation between the rod 10 and the tapered walls of the bore 18. In this position the balls 33 grip the rod 10 and prevent axial movement thereof in a downward direction as viewed in the drawings. The present locking mechanism, while restricting movement of the rod 10 in the one direction, permits movement of the rod in the other direction so that in extending the length of the strut the two sections are merely pulled in opposite directions.

To release the locking mechanism for shortening the strut, the finger piece 40 is pressed inwardly to move the release mechanism into engagement with collar 28, and additional movement of the release mechanism in this direction pushes collar 28 upwardly against the tension of spring 35 and disengages balls 33 from their gripping position, whereby the rod 10 is free to telescope into tube 11. Upon release of pressure on finger piece 40, spring 35 immediately moves the collar 28 toward the smaller end of bore 18 so that the balls 33 bind between the rod 10 and the tapered wall of bore 18 and relative axial movement in the one direction is again prevented.

The instant device presents a simplified and positive locking means for a pair of telescoping members. The locking means operates efficiently with the strut in a vertical position, regardless of which end of the strut is uppermost, and also operates efficiently with the strut in horizontal or inclined positions. Obviously, the strut may be employed for various purposes other than for holding an automobile hood in spaced relation from the body portion. The rod and tube are relatively rotatable to place the forked ends 13 in the most advantageous positions for different purposes.

Having now described my invention and in what manner the same may be used, what I claim as new and desire to protect by Letters Patent is:

A general utility adjustable length strut comprising a tubular member having a forked support on one end thereof, a rod having close fitting sliding engagement in said tubular member, a forked support on the outer end of said rod, a housing on the other end of said tubular member having a tapered bore surrounding said rod, an apertured cylindrical ball cage slidable on said rod within said bore, ball detents in said cage engageable with said rod and said bore to lock said rod against movement into said tubular member, an annular end plate in one end of said housing around said rod, a coil spring in said housing compressed between said end plate and one end of said cage urging said cage toward locked position, said housing having a hole in its other end adjacent the exterior surface of said tubular member, a stem slidable in said hole, a release ring on the inner end of said stem engageable with the other end of said cage, and an arcuate finger piece on the outer end of said stem concentric with and slidable on said tubular member for releasing said cage from said locked position.

References Cited in the file of this patent
UNITED STATES PATENTS

| | | |
|---|---|---|
| 1,031,637 | Fischer | July 2, 1912 |
| 1,101,552 | Hume | June 30, 1914 |
| 1,235,613 | Vandergrift | Aug. 7, 1917 |
| 1,351,179 | Luery | Aug. 31, 1920 |
| 2,062,628 | Yannetta | Dec. 1, 1936 |
| 2,495,610 | Smith | Jan. 24, 1950 |
| 2,658,777 | Rauglas | Nov. 10, 1953 |